Figure 1:
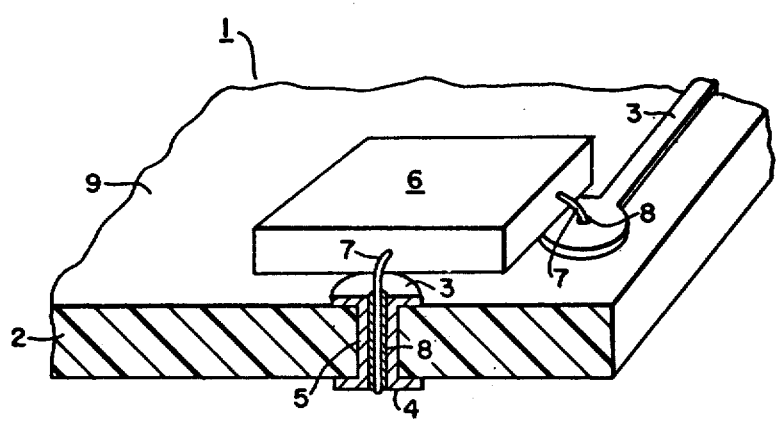

United States Patent [19]
Sprengling

[11] 3,925,297

[45] Dec. 9, 1975

[54] FILLED COMPOSITION AND ARTICLE CONTAINING PERFLUORINATED SURFACTANT

[75] Inventor: Gerhard R. Sprengling, Blairsville, Pa.

[73] Assignee: Westinghouse Electric Corporation, Pittsburgh, Pa.

[22] Filed: Apr. 30, 1974

[21] Appl. No.: 465,637

Related U.S. Application Data

[62] Division of Ser. No. 298,214, Oct. 17, 1972, Pat. No. 3,841,957.

[52] U.S. Cl........ 260/37 EP; 260/37 SB; 260/37 N; 260/40 R
[51] Int. Cl.²......................................... C08L 63/00
[58] Field of Search.......... 260/37 EP, 37 SB, 37 N, 260/40 R; 252/63, 63.5, 63.7, 64

[56] References Cited
UNITED STATES PATENTS

| | | | |
|---|---|---|---|
| 3,094,547 | 6/1963 | Heine | 260/461 |
| 3,403,131 | 9/1968 | Garnish | 260/30.4 EP X |
| 3,450,755 | 6/1969 | Ahlbrecht | 260/556 |
| 3,478,116 | 11/1969 | Smeltz | 260/633 |
| 3,573,210 | 3/1971 | Furusawa et al | 252/64 |
| 3,823,200 | 7/1974 | Pradenne et al | 260/37 EP X |

OTHER PUBLICATIONS

Pike; FLUOROCHEMICAL SURFACTANTS; "Paint and Varnish Production;" Mar. 1972; pp. 27–32.

*Primary Examiner*—Lewis T. Jacobs
*Attorney, Agent, or Firm*—R. D. Fuerle

[57] ABSTRACT

A composition is disclosed of about 15 to about 70% organic resin, about 30 to about 85% nonconductive filler, and about 0.001% to about 1.0% of a surfactant having a perfluorinated chain at least 3 carbon atoms long at one end and a polar group at the other end, and having the property of lowering the surface energy of the resin. The composition is hardened into an article such as a printed circuit board. Unexpectedly, the presence of the surfactant in the articles decreases the drop in volume resistivity which occurs in high humidity.

Also disclosed is a method of making the article by coating the filler with a solution of the surfactant, evaporating the solvent, immersing the filler in the resin, and hardening the resin.

22 Claims, 5 Drawing Figures

FILLED COMPOSITION AND ARTICLE CONTAINING PERFLUORINATED SURFACTANT

This is a division of application Ser. No. 298,214, filed Oct. 17, 1972, now U.S. Pat. No. 3,841,957.

BACKGROUND OF THE INVENTION

The electrical resistance of almost all filled, resinous, electrical insulating materials decreases when the materials are exposed to high humidity. Depending on the material, the decrease in resistance may be due to conduction across the surface of the material or to conduction through its volume or both. Decreases in surface resistance can be reduced by encapsulating the material in a hydrophobic coating, but this has little effect on volume resistance. The use of silicone "coupling agents" mixed into the resin or coating the glass of a glass-filled resin with water-repelling compounds such as methyl trichlorosilane or methyl trimethoxysilane also has little effect on volume resistance.

The decrease in volume resistance of glass reinforced resinous materials in high humidity can make it difficult or impossible to meet design objectives and can cause the failure of the circuit in operation.

RELEVANT ART

M. J. Pike in a March 1972 article in Paint and Varnish Production titled, "Fluorochemical Surfactants" describes an epoxy resin containing 0.3 percent "FC-430," a 3M Co. perfluorinated surfactant.

J. N. Shepard and John P. Ryan, in a January 1956 article in the Journal of Physical Chemistry, volume 60 pages 127 to 128, titled "The Use of C-14 Labeled Perfluoro-octanoic Acid In the Study of Adhesion and Other Surface Phenomena," describes the wetting properties of perfluoro octanoic acid. That subject is further discussed by Marianne K. Bernett and W. A. Zisman in a November, 1959 article in the Journal of Physical Chemistry, Volume 63, titled "Wetting of Low-Energy Solids By Aqueous Solutions of Highly Fluorinated Acids and Salts."

SUMMARY OF THE INVENTION

I have found that the drop in volume resistance of filled, resinous materials which occurs in high humidity is greatly reduced when certain perfluorinated surfactants are present in the material. Ordinarily, volume resistance may drop from $10^{15}$ ohms to as low as $10^6$ ohms in high humidity. In the boards of this invention internal conduction paths do not appear in high humidity and the volume resistance remains at about the level of a dry board. Also, surface resistance under these conditions remains higher than that of composites not so treated. Since surfactants usually make a surface more easily wetted, one would expect a surfactant to draw moisture into the material and lower its resistance still further. It is, therefore, quite surprising that the particular surfactants of this invention have the opposite effect. In addition, the surfactants, particularly the surfactants mixed into the resin, reduce the drop in surface resistance which occurs in high humidity even through they are not applied to the surface.

Also, normally when glass is coated with a surfactant the surfactant will prevent the resin from wetting the glass and therefore a poor bond is made between the resin and the glass which results in a decrease in flexural strength. However, a decrease in flexural strength has not been observed when glass is coated with the surfactants of this invention.

The plastic articles of this invention are used for electrical insulators such as in printed circuit boards, terminal boards, etc. The use of the surfactant in the article does not reduce the adhesion of copper to the board, nor does it cause measling after soldering (measling is the formation of opaque areas due to the bond between the resin and the glass breaking).

DESCRIPTION OF THE INVENTION

FIG. 1 is an isometric view in section of a portion of a certain presently preferred printed circuit board according to this invention.

FIGS. 2, 3, 4, and 5 are graphs explained in Example 1.

In FIG. 1 a printed circuit board 1 is composed of an insulating board 2 with conducting circuits 3 and 4, usually copper, bonded to it on each side. A plated hole 5 in the board 2 connects portions of the two circuits. Electronic component 6 has leads 7 which are thermally bonded to the circuit 3 with solder 8. A coating 9 (too thin to show on drawing) of a fluorine compound covers the board and electronic component.

The insulating board can be made of almost any organic resinous material. "Resin" as used herein includes hardeners, etc. which are used if the resin is thermosetting. Examples of suitable resins include epoxies, polyesters, nylon, polyimides, polyamide-imides, polysulfones, polyphenylene oxide, polystyrene, polyethers, phenolics, polyolefins such as polyethylene or polypropylene, etc. Epoxies, polyesters, and phenolics are the most widely used materials but an epoxy such as the diglycidyl ether of bisphenol A is preferred because of its strength, resistance to measling, and other properties desirable in printed circuit boards and other articles. The insulating board may have almost any shape or dimension, but rectangular boards 1 inch to 1 foot in length and thickness and 10 to 100 mils thick are typical sizes for use as printed circuit boards.

The resin is filled to form a composition which is about 15 to about 70% (all percentages herein are by weight) resin and about 30 to about 85% inorganic nonconductive filler. A glass-epoxy composition is typically about one-third to two-thirds glass and the rest epoxy resin, but the amount of glass can be up to 85% in filament-wound materials.

The use of the surfactants of this invention is expected to decrease the power (loss) factor when the filler is in particulate form. However, the more dramatic decrease in the drop in resistance in high humidity occurs when the filler is elongated and this invention is therefore particularly applicable to materials containing elongated fillers. The effect is primarily unidirectional in the direction of the filler when the filler is both elongated and oriented in one or more particular directions. For example, glass roving would produce a primarily unidirectional effect and glass cloth primarily a bi-directional effect. Other examples of suitable fillers include glass mat, asbestos, and silica. Glass is the preferred filler because it is inexpensive, has great strength, and is most subject to improvement by this invention.

The surfactant used in this invention has two ends a perfluorinated chain at least 3 carbon atoms long at one end and a polar group at the other end. The surfactant is essentially linear although it may have short branches. It is preferably saturated so that it is more stable to oxidation. The surfactant has the property of lowering the surface energy of the resin in which it is used both when the resin is a liquid and when the resin has solidified. This property is necessary to insure that the surfactant will migrate to the surface of the resin and to the interface of the resin with the filler. A preferred surfactant has the general formula $$C_nF_{2n+1}C_mX_{2m}Y$$

where Y is a polar group, X is H, F, Cl, Br, or a mixture thereof, $m + n$ is an integer from 3 to 18, and $m$ is an integer equal to or greater than 0.2 times $n$ (truncating the product). In the formula $n + m$ is preferably an integer from 6 to 12 as smaller surfactants are more volatile and difficult to use before they evaporate; larger surfactants are not very soluble and as they are less mobile they do not migrate to surfaces within a reasonable time.

If the surfactant is mixed into the resin, Y in the formula is a polar group capable of being chemisorbed onto the filler being used. "Chemisorbed" means that the Y groups bond to the filler with sufficient tenacity so that they are not washed off by water. The chemisorption of the surfactant on the filler prevents water from leeching it out of the material. Suitable chemisorbed Y groups include.

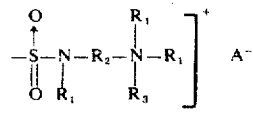

where $R_1$ is hydrogen or alkyl to $C_3$, $R_2$ is alkylene from $C_1$ to $C_3$, $R_3$ is alkyl to $C_3$, and $A^-$ is an anion. Chemisorbed surfactants should be mixed into the resin and should not be coated onto the filler in order to be effective.

If the surfactant is coated onto the filler, Y in the formula is a polar group which resists chemisorption onto the filler. Chemisorption is not desirable in this case because the concentration of the surfactant is generally high enough to form a monolayer which may repel the resin and present a good resin-filler bond. Such surfactants are preferable relatively insoluble (i.e., less than 1%) in the resin used because otherwise too much surfactant is dissolved into the resin and too little remains on the glass. Preferred non-chemisorbing groups includes —COOH, —SO$_3$H, OPO(OH)(OM), and salts thereof, where M is H or —$C_mX_{2m}C_nF_{2n+1}$ where $m$, $n$, and X are as previously defined. Examples include perfluoro butyric acid, $CF_3CF_2CF_2COOH$, and perfluoro octanoic acid, $C_7F_{15}COOH$, the latter being preferred as it is less volatile. Other suitable examples include $CF_3(CF_2)_7$ $SO_3K$, $(C_{4-12}F_{9-25}C_2H_4O)_2PO(OH)$, $C_5F_{11}COOH$, $C_9F_{19}COOH$, $CF_3(CF_2)_7SO_2N(CH_2CH_3)(CH_2)_2OP(OH)_2$, etc.

The surfactant may be coated onto the filler from about a 0.1 to about a 10% solution. Suitable solvents include water and methanol. The solution is applied to the filler by any suitable means although it is preferable to immerse the filter in the solution to insure complete and uniform coverage. The solvent is then evaporated, preferably as quickly as possible to prevent solvent which evaporates first from drawing the solution out of internal spaces which would result in a non-uniform distribution of the surfactant. Alternatively, this problem with evaporation can be avoided by using a solution in a solvent such as, for example, methanol, then leeching the solvent out of the internal spaces by washing with a miscible non-solvent such as hexane, thereby precipitating the surfactant in the internal spaces.

Resin is applied to the filler by immersion, roll coating, or other means known to the art. Solvent, if present, is evaporated and the filler-resin composite is hardened singly or in a stack of composites under up to about 1000 psi to form a laminate. If the resin is thermoplastic it is melted and is hardened by cooling. If the resin is thermosetting the resin is melted and is hardened by curing.

Since the amount of surfactant used is quite small and is inexpensive per pound of material produced, it is preferable to both coat the filler with one surfactant and mix another surfactant into the resin to gain as much protection as possible against a decrease in volume resistivity.

In order to further insure against a drop in surface resistivity particularly under flushing conditions it is preferable to coat the finished article with another type of fluorine compound which is described in my copending application of even date, Ser. No. 298,213 titled "Printed Circuit Board and Method of Making It", herein incorporated by reference. Briefly, that application describes a monomer of the formula

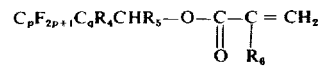

where $p$ is an integer from 2 to 9, $q$ is an integer from 1 to 9, $R_6$ is —H or —$CH_3$, $R_5$ is H, F, Cl, or Br, and 80 to 100% of the $R_4$ atoms are F and 0 to 20% of the $R_4$ atoms are H, Cl, Br, or mixtures thereof. The monomer itself may be used or a prepolymer of it may be used. Preferably, a prepolymer of about 50 to about 100 polymeric units is used as it has about the right combination of non-volatility and solubility. The compound or prepolymer is dissolved in a solvent such as xylene hexafluoride, the solution is applied to the article, and the solvent is evaporated.

EXAMPLE 1

Glass-epoxy test boards 1/16 inches thick were provided with electrodes ⅛, ¼ and ½ inches apart which passed through the boards. Each group of 5 to 50 boards was placed in 100% relative humidity and tested periodically until the resistance between the electrodes no longer decreased. The tests were made at 500 volts after holding at 500 volts for 1 minute.

Figure 2:
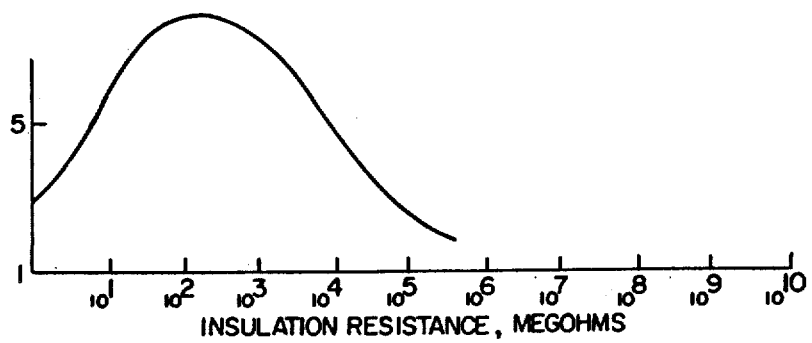

The first group of boards were cleaned with chlorethane then placed in 100% RH and tested. FIG. 2 gives the distribution of the resistances obtained for these boards.

Figure 3:
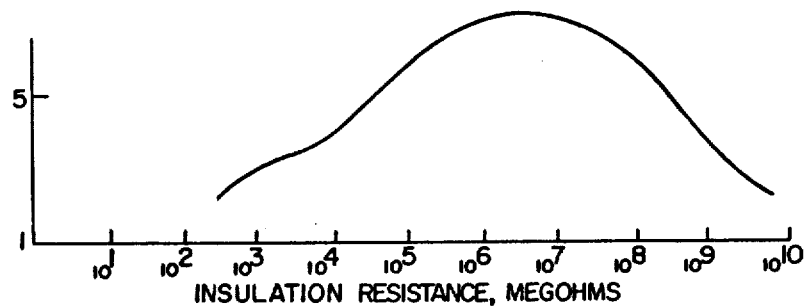

The second group of boards was cleaned with chlorethane, then with isopropanol, rinsed with water, placed in 100% RH and tested. FIG. 3 gives the distribution of the resistances obtained with these boards and shows the considerable improvement which resulted from superior cleaning.

Figure 4:
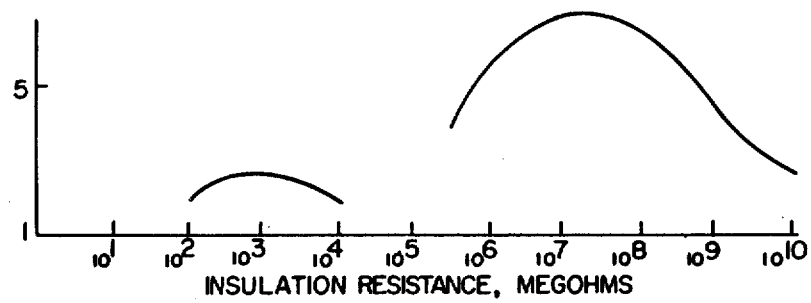

The third group of boards was cleaned as the second group, then was dipped into a 2% xylene hexafluoride solution of a prepolymer sold under the trademark "FC-706" by the 3M Company, believed to be a solution of $C_7F_{15}CH_2OOC—C(CH_3) = CH_2$. The solvent was evaporated and the coating heated at 150°C for 10 minutes. The boards were placed in 100% RH and tested. FIG. 4 gives the distribution of the resistances obtained with these boards. In FIG. 4 the curve on the right is due to surface resistance and indicates that a large number of boards had no internal conductive paths. The smaller curve on the left is due to volume resistance and indicates that a small number of boards had internal conductive paths.

The fourth group of boards were made according to this invention. Glass cloth was dipped into a 0.2% aqueous solution of a surfactant sold under the trademark "FC-95" by the 3M Company and analyzed as

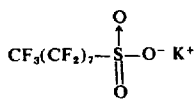

The solvent was evaporated leaving about 0.07% of the surfactant on the glass (based on the weight of the glass). The glass was coated with the same resin used to make groups one, two, and three—an epoxy resin (diglycidyl ether of bisphenol A), containing a hardener, catalyst, particulate filler and dye. The resin also contains 0.02% surfactant sold by the 3M Company under the trademark "FC-134," analyzed as

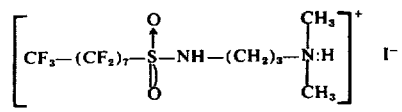

Figure 5:
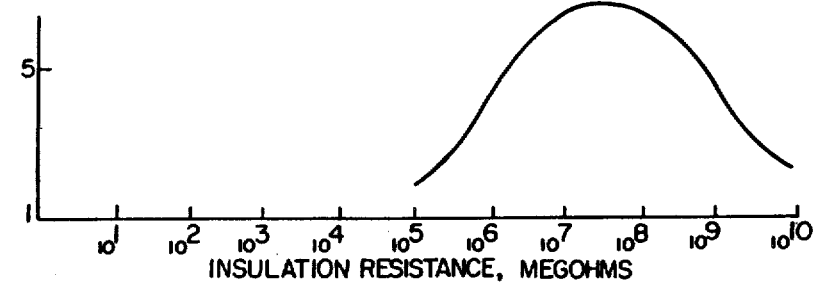

The coated glass sheets were dried, stacked in groups of eight, then cured at 160°C and 1500 psi for about an hour. The resulting boards were cleaned as was the second group of boards, then coated as was the third group of boards. The boards were placed in 100% RH and tested. FIG. 5 gives the distribution of the resistances obtained with these boards. The curve on the left in FIG. 4 has disappeared from FIG. 5 indicating that none of the boards of this group had internal conducting paths. The boards were found to have a flexural strength of 75,000 psi in the machine direction and 52,000 psi in the cross-direction, a peel bond at 90° of 9 to 10 lbs./in., a dielectric constant at 4.9 after 96 hours at 35°C in 90% RH, a dissipation factor of 0.23 after 96 hours at 35°C in 90% RH, a dielectric strength (KV) of 90 to 100 in oil parallel to the laminate, and a water absorption of 0.11% after 24 hours at 23°C in water. These properties are comparable to the properties of identical boards not containing surfactants.

EXAMPLE 2

Glass cloth of various finishes was dipped into a solution of various surfactants. The cloth was then either air dried or the surfactant was precipitated with hexane (see Experiment No. 2 on following table). The cloth was dipped into a diglycidyl ether of bisphenol A resin containing an anhydride curing agent. Some resins also contained a surfactant. The cloth was heated to "B-stage" the resin thereby forming sheets. Eight sheets were stacked with 1 oz. copper foil at each face and pressed at 1500 psi for about an hour at 160°C to form boards.

Electrodes were etched on the copper surfaces and were connected face-to-face by drilled and plated holes. After storage at 95 to 100% RH for various lengths of time, the average insulation resistance was determined at 500 volts. The following table gives the results:

| Experiment Number | Finish on Cloth | Surfactant Solution Deposited on Cloth | Surfactant in Resin | Resistance (ohms) After | | | |
|---|---|---|---|---|---|---|---|
| | | | | 1 day | 3 days | 5 days | 15 days |
| 1 | heat cleaned | 0.1% "FC-95" in methanol | 0.01% "FC-95" | $5 \times 10^{10}$ | $1.4 \times 10^{12}$ | $4 \times 10^{12}$ | |
| 2 | heat cleaned | 0.2% "FC-95" precepitated | None | $1.8 \times 10^{11}$ | $1.3 \times 10^{12}$ | $1.0 \times 10^{12}$ | $1.3 \times 10^{13}$ |
| 3 | heat cleaned | 0.2% "FC-95" in water | None | $1.7 \times 10^{12}$ | | $1.6 \times 10^{13}$ | $2.0 \times 10^{13}$ |
| 4 | heat cleaned | 0.2% $C_7F_{13}COOH$ in water | None | $1.5 \times 10^{13}$ | $1.5 \times 10^{7}$ | $5 \times 10^{12}$ | $1.3 \times 10^{13}$ |
| 5 | glycidoxy-trismethoxy silane | 0.2% $C_3F_{11}COOH$ in water | None | $3.3 \times 10^{10}$ | $2 \times 10^{12}$ | $7 \times 10^{12}$ | |
| 6 | heat cleaned | 0.2% "MPD-3676" in water | 0.01% "MPD 3676" | $3.5 \times 10^{11}$ | $5 \times 10^{12}$ | $2 \times 10^{12}$ | $5 \times 10^{13}$ |
| 7 | heat cleaned | 0.2% "FC-134" in water | 0.01% "FC-95" | | $1 \times 10^{9}$ | $2 \times 10^{8}$ | $1.5 \times 10^{8}$ |
| 8 | heat cleaned | 0.1% $C_9F_{19}COOH$ in water | None | | $1.5 \times 10^{10}$ | $2.4 \times 10^{12}$ | |
| 9 | heat cleaned | 0.2% "FC-134" in water | None | $3 \times 10^{8}$ | $1.6 \times 10^{8}$ | | |
| 10 (Control) | heat cleaned | None | None | $9 \times 10^{9}$ | $4 \times 10^{9}$ | $2.5 \times 10^{9}$ | $2.5 \times 10^{9}$ |

"MPD-3676" is a trademark of the Dupont Company and is analyzed as having the structure $(C_mF_{2m+1}C_2H_4O)_y — PO(OH)_{3-y}$ where $m$ is an integer from 4 to 12 (a mixture) and $y$ is 1 or 2.

The table shows the efficacy of the surfactants in reducing the drop in resistance in high humidity. Experiments No. 7 and 9 illustrate the ineffectiveness of the surfactants when not used according to the teachings of this invention.

EXAMPLE 3

A composition was prepared containing the resin of Example 1, 65% glass roving, and 0.2% "FC-134," a second identical composition was prepared which did not contain the "FC-134," and a third and fourth composition was prepared which also did not contain the "FC-134" but which used glass coated with a coupling agent γ-aminopropyl trismethoxy silane. Then 1/16 inch laminates were prepared as described in Example 1 and the copper surfaces etched to form electrodes about ½ inch apart stressing about 2 squares. The electrodes on each side were connected by drilled and plated holes. The following table gives the insulation resistance parallel to the roving after various times at 95 to 100% RH, determined at 500 volts.

| Laminate | 1 day | Resistance (ohms) After 2 days | 6 days |
| --- | --- | --- | --- |
| Control | $3.8 \times 10^9$ | $1.3 \times 10^{10}$ | $9 \times 10^9$ |
| Coupling Agent | $1.5 \times 10^9$ | $1.2 \times 10^8$ | |
| "FC-134" | $6 \times 10^{10}$ | $3.5 \times 10^9$ | $5 \times 10^{11}$ |

The above table shows that after 6 days enough "FC-134" had migrated to the surfaces and resin-glass interfaces to cause an increase in the resistance. The coupling agent was not effective in raising the resistance.

I claim:
1. A composition comprising
   1. about 15 to about 70% synthetic, organic resin;
   2. about 30 to about 85% non-conductive filler; and
   3. about 0.001% to about 1.0% of a surfactant having a perfluorinated chain at least 3 carbon atoms long at one end and a polar group at the other end, said surfactant possessing the property of lowering the surface energy of said resin by freely migrating to the surface of said resin and to its interfaces with said filler after said resin is hardened.
2. A composition according to claim 1 wherein said synthetic organic resin is an epoxy resin.
3. A composition according to claim 2 wherein said epoxy resin is a diglycidyl ether of bisphenol A.
4. A composition according to claim 1 wherein said filler is an elongated filler.
5. A composition according to claim 4 wherein said filler is glass.
6. A composition according to claim 1 wherein said surfactant has the general formula
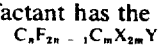
where each X is independently selected from the group consisting of F, H, Cl, Br, and mixtures thereof, Y is a polar group capable of being chemisorbed onto said filler, $m + n$ is an integer from 3 to 18, and $m$ is an integer at least as great as the truncated product of 0.2 times $n$.
7. A composition according to claim 6 wherein $n + m$ is an integer from 6 to 12.
8. A composition according to claim 6 wherein Y is

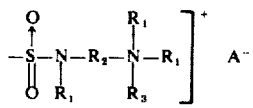

where each $R_1$ is independently selected from the group consisting of hydrogen and alkyl to $C_3$, $R_2$ is alkylene from $C_1$ to $C_3$, $R_3$ is alkyl to $C_3$, and $A^-$ is an anion.
9. A composition according to claim 1 wherein said surfactant is concentrated on said filler and has the general formula
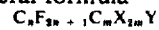
where each X is independently selected from the group consisting of F, H, Cl, Br, and mixtures thereof, Y is a polar group which resists chemisorption on said filler, $m + n$ is an integer from 3 to 18, and $m$ is an integer at least as great as the truncated product of 0.2 times $n$.
10. A composition according to claim 9 wherein $n + m$ is an integer from 6 to 10.
11. A composition according to claim 9 wherein Y is selected from the group consisting of —COOH, —SO₃H, —OPO(OH)(OM), and salts thereof, where M is selected from the group consisting of H and —$C_mX_{2m}C_nF_{2n+1}$ where $m + n$ is an integer from 3 to 18, $m$ is an integer at least as great as the truncated product of 0.2 times $n$, and each X is independently selected from the group consisting of F, H, Cl, Br, and mixtures thereof.
12. A composition according to claim 11 wherein said surfactant is $C_7F_{15}COOH$.
13. A filled plastic article comprising a hardened composition according to claim 1.
14. An article according to claim 13 wherein a portion of said surfactant is distributed throughout said resin and has the general formula
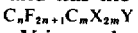
where Y is a polar group capable of being chemisorbed on said filler, and another portion of said surfactant is concentrated on said filler and has the general formula
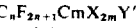
where Y' is a polar group which resists chemisorption on said filler, where each X is independently selected from the group consisting of F, H, Cl, Br, and mixtures thereof, $m+n$ is an integer from 3 to 18, and $m$ is an integer at least as great as the truncated product of 0.2 times $n$.
15. An article according to claim 14 wherein Y' is selected from the group consisting of —COOH and —SO₃H and Y is

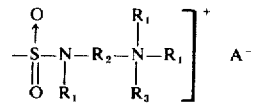

where each $R_1$ is independently selected from the group consisting of hydrogen and alkyl to $C_3$, $R_2$ is alkylene from $C_1$ to $C_3$, $R_3$ is alkyl to $C_3$, and $A^-$ is an anion.
16. A composition according to claim 1 wherein said surfactant is saturated.
17. A composition according to claim 1 wherein said surfactant comprises
A. a first surfactant mixed into said resin having the general formula
where each X is independently selected from the group consisting of F, H, Cl, Br, and mixtures thereof, $m + n$ is an integer from 3 to 18, $m$ is an integer at least as great as the truncated product of 0.2 times $n$, each $R_1$ is independently selected from the group consisting of hydrogen and alkyl to $C_3$, $R_2$ is alkylene from $C_1$ to $C_3$, $R_3$ is alkyl to $C_3$, and $A^-$ is an anion; and
B. a second surfactant concentrated on said filler and having the general formula
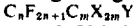
where each X is independently selected from the group consisting of F, H, Cl, Br, and mixtures thereof, $m + n$ is an integer from 3 to 18, $m$ is an integer at least as great as the truncated product of 0.2 times $n$, and Y is selected from the group consisting of —COOH, —SO₃H, —OPO(OH)(OM), and salts thereof, where M is selected from the group consisting of H and —$C_mX_{2m}C_nF_{2n+1}$, where $m + n$ is an integer from 3 to 18, $m$ is an integer at least as great as the truncated product of 0.2 times $n$, and each X is independently selected from the group consisting of F, H, Cl, Br, and mixtures thereof.
18. A composition according to claim 17 wherein said filler is elongated.

19. A composition according to claim 4 wherein said elongated filler is unidirectional.
20. A composition according to claim 4 wherein said elongated filler is bidirectional.
21. A composition according to claim 8 wherein said surfactant is
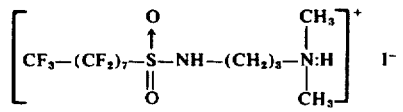
22. A composition according to claim 11 wherein said surfactant is
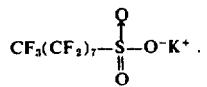
* * * * *